June 12, 1934. F. A. SCHMIDT ET AL 1,962,879
CONVEYER
Filed June 24, 1933
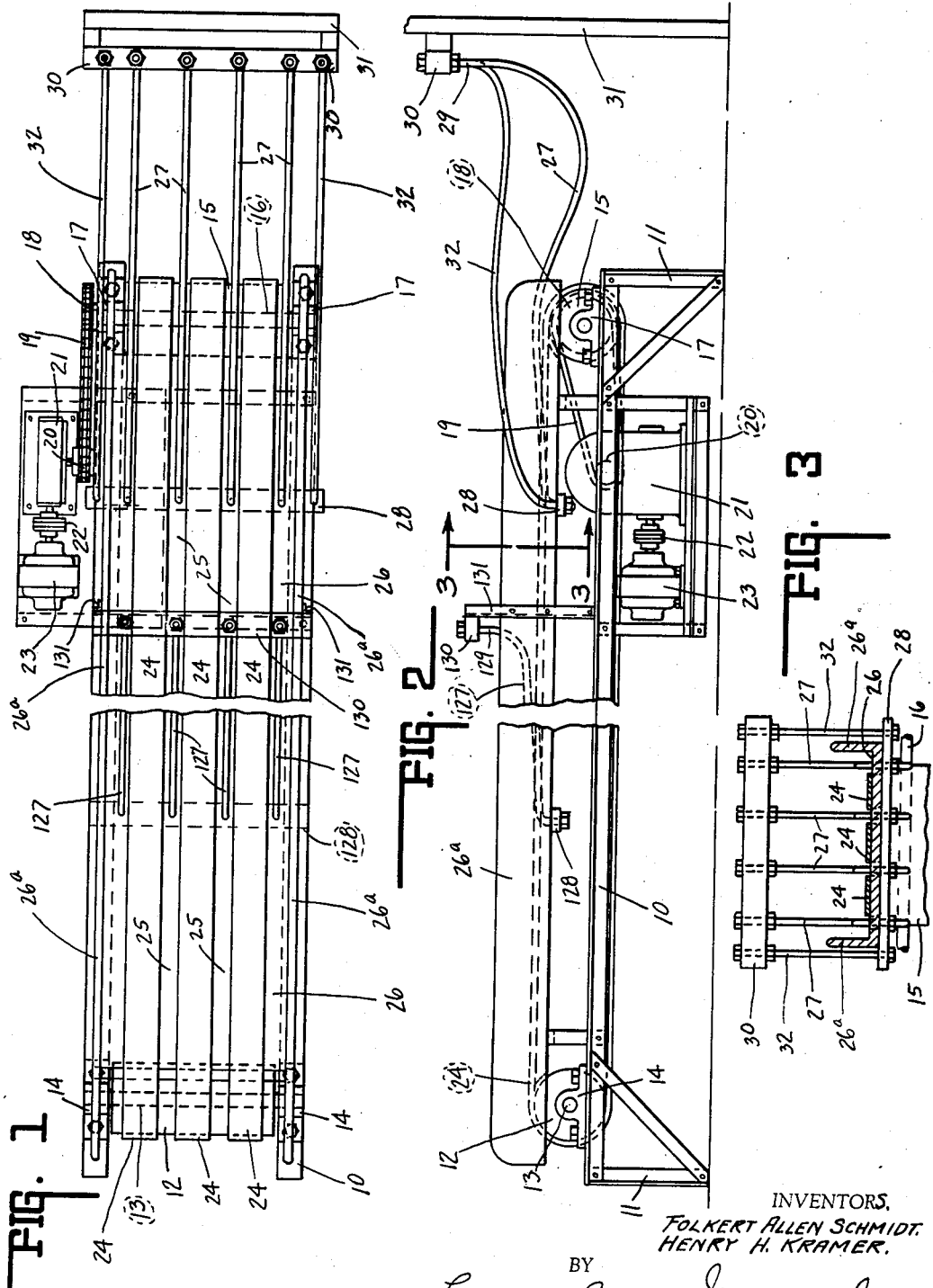
INVENTORS.
FOLKERT ALLEN SCHMIDT.
HENRY H. KRAMER.
BY
Lockwood Lockwood Goldsmith & Galt
ATTORNEYS.

Patented June 12, 1934

1,962,879

UNITED STATES PATENT OFFICE 1,962,879

CONVEYER

Folkert Allen Schmidt and Henry H. Kramer, Terre Haute, Ind., assignors to Stahl-Urban Company, Terre Haute, Ind., a corporation Application June 24, 1933, Serial No. 677,397

5 Claims. (Cl. 198—185)

This invention relates to a conveyer and particularly the off-bearing end thereof for receiving and supporting free of the conveyer such articles as are carried thereby. It is particularly applicable for use in conveying garments or garment parts from one operation to another in production, and storing the conveyed garments at the end of the conveyer to await removal.

The principal object of the invention consists in employing a plurality of parallel spaced endless conveyer belts between which the bars of a "comb-out" basket extend adjacent the off-bearing end, however, a similar basket may be employed at any desired location intermediate the ends of the conveyer. By means of this arrangement, the material conveyed is caused by the friction of the belts or the force applied by the oncoming materials to slide up the inclined bars of the cage until free from engagement with the belts, whereupon they will be retained until removed without interfering with the oncoming travel of the following articles.

The full nature of the invention will be understood from the accompanying drawing and the following description and claims:

Fig. 1 is a plan view of the conveyer. Fig. 2 is a side elevation thereof. Fig. 3 is a section taken on the line 3—3 of Fig. 2.

In the drawing there is illustrated a conveyer supported by the longitudinal frame 10 upon the uprights 11. Adjacent the receiving end of the conveyer there is an idler pulley 12 extending the full width thereof and supported upon the shaft 13 mounted in the bearings 14. Said bearings in turn are supported upon the horizontal frame bars 10. At the opposite end of the machine there is a driving pulley 15 similarly supported upon the shaft 16 mounted in the bearings 17. At one end of the shaft 16 there is a sprocket wheel 18 driven by the chain 19 from the sprocket 20. The sprocket 20 is driven from suitable reduction gears contained in the gear case 21 which in turn are driven through the coupling 22 by the motor 23 supported by one of the horizontal frame members 10.

Mounted about the pulleys 12 and 15 there are a plurality of endless conveyer belts 24 extending in horizontal spaced relation to provide intermediate spaces 25. The effective conveyer portions of the belts are supported by and slide over the surface of the bottom 26 of a longitudinally extending trough having side walls 26a.

Adjacent the off-bearing end of the conveyer there is a basket for receiving the articles, such as garments, garment parts and the like. Said basket comprises a plurality of inclined parallel spaced rods 27 extending into the spaces 25 between the belts 24 so as to embrace them. The lower ends of the rods are anchored to the bottom 26 of the trough as indicated at 28 below the conveying surface of the belts. From such anchorage they are slightly inclined upwardly in the direction of travel of the belts. After rising above the surface thereof, they extend slightly beyond the off-bearing terminal of the conveyer and then dip downwardly to form a pocket to accommodate an accumulation of the conveyed articles. From the pocket they are curved upwardly to provide a stop as indicated at 29. The upper ends of the rods are secured by the bracket 30 to an end wall or upright support 31 of any suitable character. Where desired, the receiving basket formed by said rods may be provided with a guard rail 32.

In operation, articles placed on the receiving end of the conveyer will be carried by the continuously moving belts through the trough into engagement with the rods of the receiving basket adjacent the off-bearing end, whereupon their movement and the frictional engagement of the belt will cause them to slide upwardly thereon substantially free of the conveyer. Oncoming articles will push them further along the rods until they gradually pile up in the basket against the upright stop 29. They will thus be accumulated and held in the basket until removed, free of effective or detrimental contact with the continuously moving belts.

As illustrated in dotted lines, an intermediate "comb-out" basket may be employed wherein the rods 127 are secured to the bottom of the trough at any desired location intermediate its ends by the nut 128, an upright standard 121 being secured to the sides of the trough for supporting the upwardly extending free ends of the rods forming the basket.

The invention claimed is:

1. The combination with a conveyer having a power driven belt for conveying articles, of a basket for receiving and storing articles conveyed thereby comprising a rod mounted on each side of said belt and extending at an angle to the plane of travel thereof from below the belt to a higher plane, said rods having their lower ends anchored below said belt adjacent the off-bearing end thereof and terminating in an upwardly curved portion rigidly secured to an upright support, whereby articles conveyed thereto are caused to slide upwardly on said rods out of effective engagement with the conveyer.

2. A conveyer comprising a supporting frame, pulleys rotatably mounted on said frame, a plurality of endless belts supported upon said pulleys adapted to move in unison in parallel spaced relation with each other for providing a conveying surface for articles to be conveyed, means for driving one of said pulleys, a plurality of rods inclined upwardly in the direction of travel of said articles having their forward ends secured to said frame between and below the surface of the belts, each of said rods extending in spaced parallel relation with each other, and means for supporting the rear ends of said rods above the surface of the belts for maintaining them in inclined position to receive said articles and support them out of effective engagement with said belts.

3. A receiving basket for conveyers comprising a plurality of spaced rods extending in parallel spaced relation to provide a supporting surface for articles conveyed thereto, means for anchoring the receiving ends of said rods adjacent the off-bearing end of the conveyer and below the surface thereof, and means for supporting the opposite ends of said rods in upright position, said rods being inclined upwardly from the conveyer for supporting said articles out of effective engagement therewith.

4. A receiving basket for conveyers comprising a plurality of spaced rods extending in parallel spaced relation to provide a supporting surface for articles conveyed thereto, means for anchoring the receiving ends of said rods adjacent the off-bearing end of the conveyer and below the surface thereof, means for supporting the opposite end of said rods in upright position for maintaining said rods in angular relation with the conveyer to support articles received thereon above the surface of the conveyer and out of effective engagement therewith, and a depressed portion formed intermediate the ends of said rods and beyond the off-bearing end of the conveyer to provide a well for retaining the articles received thereby.

5. An endless conveyer comprising a longitudinal trough through which articles are adapted to be conveyed, said trough having a bottom surface and upright side walls extending throughout the length thereof, an endless belt, means for supporting and driving said belt for causing it to slide over the bottom of said trough between said side walls, and rods at the off-bearing end of the conveyer having their inner ends secured to the bottom of said trough on each side of said conveyer, said rods extending upwardly in parallel spaced relation to a plane above said belt for receiving articles conveyed thereby, lifting and retaining them out of effective engagement with the conveyer.

FOLKERT ALLEN SCHMIDT.
HENRY H. KRAMER.